(12) United States Patent
Wilder et al.

(10) Patent No.: US 11,865,696 B1
(45) Date of Patent: Jan. 9, 2024

(54) BALANCING COMPUTE FOR ROBOTIC OPERATIONS

(71) Applicant: Wilder Systems Inc., Austin, TX (US)

(72) Inventors: William Wilder, Austin, TX (US); Spencer Voiss, Austin, TX (US)

(73) Assignee: Wilder Systems Inc., Austin, TX (US)

( * ) Notice: Subject to any disclaimer, the term of this patent is extended or adjusted under 35 U.S.C. 154(b) by 0 days.

(21) Appl. No.: 18/447,175

(22) Filed: Aug. 9, 2023

Related U.S. Application Data

(60) Provisional application No. 63/481,576, filed on Jan. 25, 2023, provisional application No. 63/481,563, filed on Jan. 25, 2023, provisional application No. 63/377,149, filed on Sep. 26, 2022, provisional application No. 63/398,203, filed on Aug. 15, 2022, provisional application No. 63/398,202, filed on Aug. 15, 2022, provisional application No. 63/396,938, filed on Aug. 10, 2022.

(51) Int. Cl.
*B25J 13/00* (2006.01)
*B25J 9/16* (2006.01)
*B64F 5/40* (2017.01)

(52) U.S. Cl.
CPC ............ *B25J 13/006* (2013.01); *B25J 9/161* (2013.01); *B25J 9/1661* (2013.01); *B25J 9/1679* (2013.01); *B64F 5/40* (2017.01)

(58) Field of Classification Search
CPC ........ B25J 13/006; B25J 9/161; B25J 9/1661; B25J 9/1679; B64F 5/40
See application file for complete search history.

(56) References Cited

FOREIGN PATENT DOCUMENTS

WO    WO-2022186777 A1 * 9/2022

OTHER PUBLICATIONS

Oridate , "Velocity-Based Robot Motion Planner for Under-Constrained Trajectories with Part-Specific Geometric Variances", The University of Texas, Dec. 2021, 178 pages.

* cited by examiner

*Primary Examiner* — Basil T. Jos
(74) *Attorney, Agent, or Firm* — Kilpatrick Townsend & Townsend LLP

(57) ABSTRACT

The present disclosure relates to a multi-tiered computing environment for balancing compute resources in support of robot operations. In an example, a robot is tasked with performing an operation associated with an airplane having an airplane model. To do so, the robot may need another operation that is computationally complex to be performed. An on-premises server can execute a process that corresponds to this computationally-complex operation based on sensor data of the robot and can output the resulting data to the robot. Next, the robot can use the resulting data to execute another process corresponding to its operation and can indicate performance of this operation to the on-premises network. The on-premises network can send the indication about the operation performance to a top-tier server that is also associated with the airplane model.

28 Claims, 9 Drawing Sheets

BALANCING COMPUTE FOR ROBOTIC OPERATIONS

CROSS-REFERENCE TO RELATED APPLICATIONS

This application claims priority under 35 U.S.C. § 119(e) to U.S. Provisional Application No. 63/396,938, filed Aug. 10, 2022, U.S. Provisional Application No. 63/398,202, filed on Aug. 15, 2022, U.S. Provisional Application No. 63/398,203, filed on Aug. 15, 2022, U.S. Provisional Application No. 63/377,149, filed on Sep. 26, 2022, U.S. Provisional Application No. 63/481,563, filed on Jan. 25, 2023, and U.S. Provisional Application No. 63/481,576, filed on Jan. 25, 2023, the contents of which is are herein incorporated by reference.

BACKGROUND

Industrial robotics is an expanding field for various industries that want to improve their internal and customer-facing processes. Industrial robots can be fabricated and programmed to perform various tasks for different applications. This customizability has led many enterprises to expand the incorporation of robots from manufacturing to other processes to improve the safety and the efficiency of enterprise workers.

BRIEF DESCRIPTION OF THE DRAWINGS

Various embodiments in accordance with the present disclosure will be described with reference to the drawings in which.

DETAILED DESCRIPTION

Figure 1:
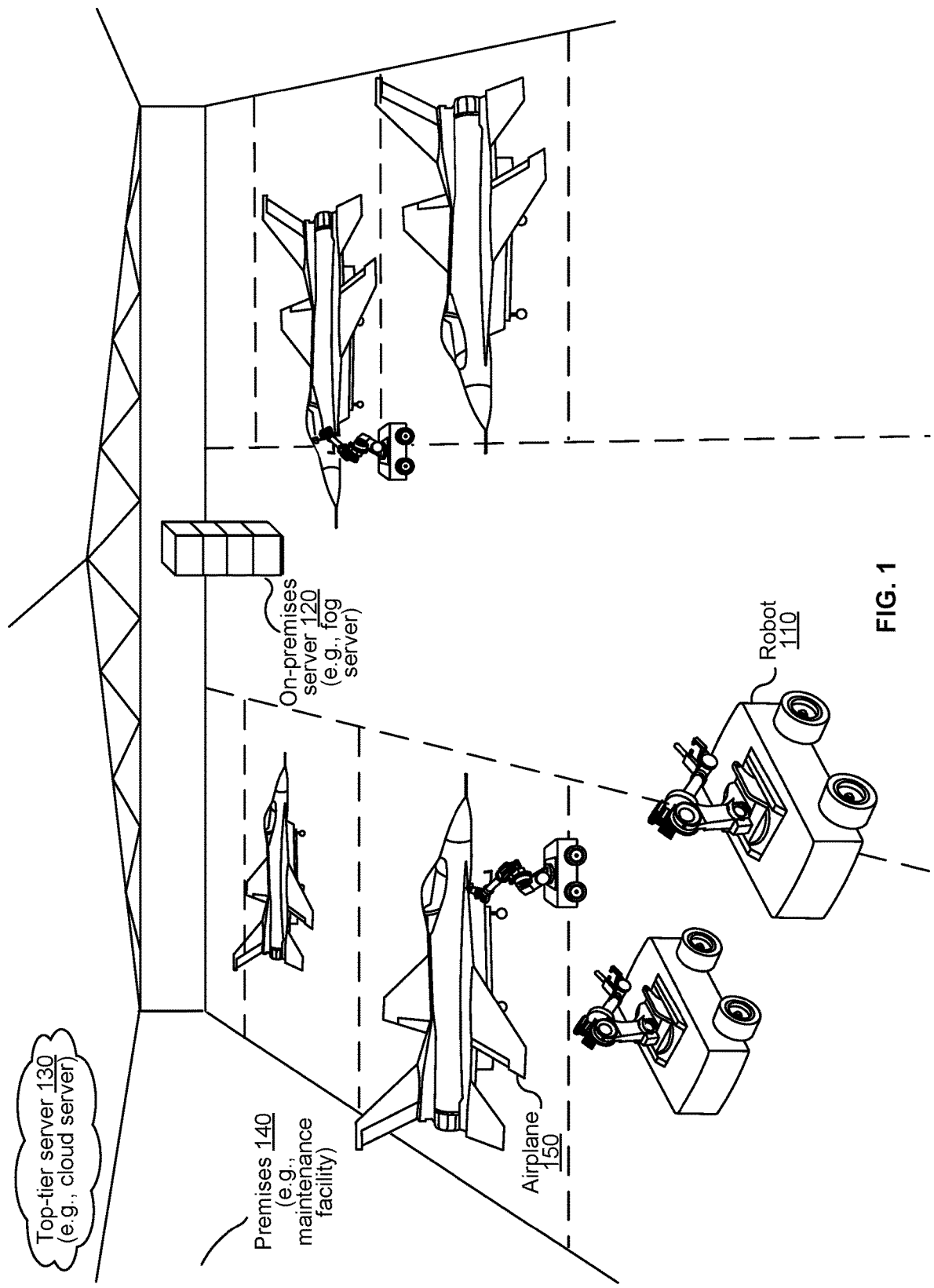
FIG. 1 illustrates an example of a network environment for robotic operations, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Robots can be deployed to perform different operations on targets in an operational environment. For example, robots can be deployed in a facility to perform manufacturing and/or maintenance operations on airplanes or parts thereof. At least some of the operations can be autonomously performed. Performing an autonomous operation involves executing a process that embodies a set of computer algorithms. The execution can be computationally complex, necessitating a relatively large compute resource (e.g., central processing units, graphics processing unit, memory space, etc.) and a relatively large power consumption. One possible design is to implement the needed compute resource and power system on a robot that then executes the autonomous operation. Another possible design is to offload the execution to a server that is communicatively coupled with a robot. The latter design can be technologically advantageous as it can reduce the robot design complexity and, by doing so, enables a more agile, nimble, and transportable robot. However, for such design to be effective, at least regarding the autonomous operation, network latency needs to be minimal and network security needs to be maximal.

Embodiments of the present disclosure enable a distribution of compute between robots and servers, such that robotic autonomous operations can be properly supported (e.g., with minimal network latency and maximal network security). In the interest of clarity of explanation, such operations are described herein in the context of manufacturing and/or maintaining airplanes or parts thereof, although the embodiments are not limited as such and similarly apply to other vehicles (e.g., boats, automobiles, rockets, etc.) and any type of autonomous robotic operation.

In an example, a tiered network architecture is used. The architecture can include a top-tier server associated with an airplane model (e.g., a type of airplane having particular tail numbers and designed to a particular configuration and/or operated by a particular program office). The top-tier server can be configured as the truth source for the airplane model by storing and maintaining information about the different airplane tail numbers, including information about operations performed thereon and/or on parts of such airplanes. The top-tier server can also manage the operations by, for instance, scheduling and tracking them. The architecture can also include an on-premises server located on a premises (e.g., where airplanes of the airplane model may be located), associated with the airplane model, and communicatively coupled with the top-tier server. The on-premises server can execute a set of processes, each of which can correspond to a set of compute algorithms for a robotic autonomous operation. The top-tier server can be implemented as a cloud server and/or can be remote, whereas the on-premises server can be implemented as a fog server or an edge server. Further, the architecture can include a plurality of robots located on the premises. Each of the robots can be configured to perform autonomous operations on a plurality of airplane models that include the airplane model. When a robot is to perform an autonomous operation on an airplane of the airplane model (or on a part thereof) and when the autonomous operation is of a particular type (e.g., a computationally complex operation), the robot can generate data (e.g., by using one or more sensors) for this operation and, given that the on-premises model is associated with the airplane model, request the on-premises server to execute the corresponding process given the data. The on-premises server returns an output of the execution to the robot and can indicate this output to the top-tier server. In comparison, when the robot is to perform an autonomous operation on the airplane (or the part thereof) and when the autonomous operation is of a different type (e.g., a computationally simple operation and/or a latency-sensitive operation), the robot can locally execute the corresponding process and inform the on-premises server about performing the operation. In turn, the on-premises server can update the top-tier server about the performance of the operation.

FIG. 1 illustrates an example of a network environment for robotic operations, according to some embodiments. The example network environment includes a plurality of robots 110, an on-premises server 120, and a top-tier server 130. The robots 110 are communicatively coupled with the on-premises server 120 that, in turn, is communicatively coupled with the top-tier server 130. Further, the robots 110 and the on-premises server 120 can be deployed to be on the same premises, whereas the top-tier server 130 may be deployed remotely from the premises. The on-premises server 120 and the top-tier server 130 can be deployed to support a particular airplane model, whereas the robots 110 can be capable of autonomous operations on different airplane models. In the illustration of FIG. 1, the on-premises represents an enclosure 140 that includes airplanes 150 of the airplane model. Autonomous operations by the robots 110 are to be performed on such airplanes 150 and/or parts thereof (e.g., on wings, fuselage sections, etc.).

In an example, the enclosure 140 can be a warehouse, a storage facility, a manufacturing facility, or any other building with controlled access thereto and housing the airplanes 150. The airplanes 150 can be distributed at predefined areas (e.g., bays) within the enclosure 140 or can be scattered without a particular pre-defined arrangement or predefined areas.

The enclosure 140 can also include a parking area for storing or queuing the robots 110 when not performing operations. A robot 110 can be summoned from the parking area to an operational area that contains an airplane 150. The robot 110 can autonomously navigate to the operational area and, once thereat, perform a set of operations to register the airplane 150 (or a part thereof) to then perform another set of operations on the airplane 150 (and/or the airplane part). Some of these operations can be computationally expensive (e.g., an airplane registration operation), whereas other operations can be less computationally expensive and more latency sensitive (e.g., drilling a fastener hole operation). The computationally expensive operation(s) can be off-loaded to the on-premises server 120, whereas the remaining operation(s) can be performed locally by the robot 110. Once the different operations are completed, the robot 110 can autonomously return to the parking area or can be summoned to another operational area.

In an example, a robot 110 includes a movable base, a power system, a powertrain system, a navigation system, a sensor system, a robotic arm, an end effector, input and output (I/O) interfaces, and a computer system. The end effector can support a particular autonomous operation (e.g., drilling) can be a line-replaceable unit with a standard interface, such that the end effector can be replaced with another one that supports a different autonomous operation (e.g., sealing). The end effector replacement can be carried by the robot 110 itself or can use a manual process, where an operator can perform the replacement. The I/O interfaces can include a communication interface to communicate with the on-premises server 120 and a user interface for manual control of the robot 110 or for selection of autonomous operations to be performed by the robot 110. The computer system can include one or more processors and one or more memory storing instructions that, upon execution by the one or more processors, configure the robot 110 to perform different operations. The instructions can correspond to program codes for the navigation, controls of the power system, controls of the powertrain system, the collection and processing of sensor data, the controls of the robotic arm, the controls of the end effectors, and/or the communications.

The on-premises server 120 can be a hardware computer system that includes one or more I/O interfaces to communicate with the robots 110 and with the top-tier server 130, one or more processors, and one or more memory storing instructions that, upon execution by the one or more processors, configure the on-premises server 120 to perform different operations. The instructions can correspond to program codes for the communications and for processes to be executed locally on the on-premises server 120 for a robot 110 given data sent by the robot 110.

The top-tier server 130 can be a hardware computer system or a virtualized computer system on hardware that includes one or more I/O interfaces to communicate with the on-premises server 120, one or more processors, and one or more memory storing instructions that, upon execution by the one or more processors, configure the top-tier server 130 to perform different operations. The instructions can correspond to program codes for the communications and for processes to be executed locally on the on-top-tier server 130. These processes can include, for instance, maintaining a truth source for all operations performed in association with the airplane model (e.g., on the different airplanes 150 and/or parts thereof) and for all data related to the airplane model (e.g., computer aided design (CAD) models for the airplanes 150 and/or parts thereof).

In an example, wireless communications (e.g., through a wireless network) can be established between the robots 110 and the on-premises server 120. The wireless communications can be protected (e.g., by using encryption). Communications between the on-premises server 120 and the top-tier server 130 can be over a public data network (e.g., the Internet) and/or a private data network (e.g., an Intranet). Here also, the communications can be protected (e.g., by using encryption).

In an example, the top-tier server 130 is configured to provide electronics manufacturing services (EMS) related to the on-premises 140 in association with the airplane model. In this example, the top-tier server 130 can send operational instructions to the on-premises server 120 related to an airplane 150 (e.g., having a particular tail number) or a part thereof. The on-premises server 120 can maintain status data indicating the operational status and capability data indicating the operational capabilities of each robot 110. The operational status of a robot 110 can be available (e.g., the robot 110 can be deployed), busy (e.g., the robot 110 is already deployed), or unavailable (e.g., the robot 110 is down for maintenance). The on-premises server 120 can also maintain data indicating locations of the airplanes 150. The operational capabilities can indicate the autonomous operations that the robot 110 can support (e.g., drilling, sealing, cleaning, etc.). Given the operational instructions, the status data, and the capability data, the on-premises server 120 can select a robot 110 (e.g., one that is available and capable to support the operational instructions) and instruct the robot 110 to move to the area that contains the airplane 150.

In another example, the on-premises server 120, rather than the top-tier server 130, is configured to provide the EMS. In this case, the on-premises server 120 can select and send operational instructions to a robot 110 based on the status data and the capability data.

In both EMS examples above, multiple operations may be needed to be performed and inter-dependencies between these operations may exist. For instance, to drill fastener holes on an airplane 150, the robot may need to first navigate to the airplane's 150 area, register the airplane 150 so that it can be located in a local coordinate system of the robot 150, detect the locations for drilling, control the robotic arm to move to the locations according to a particular trajectory, and control the end effector to drill. Some of the operations can be computationally expensive and performed less frequently (e.g., generating a simultaneous localization and mapping (SLAM) map, registration), whereas other operations can be computationally less expensive but latency sensitive and performed more frequently (e.g., controlling the robotic arm and end effector). As such, the on-premises server 120 can execute processes for the computationally expensive/less frequently performed operations, whereas the robot 110 can locally execute processes for the remaining operations.

In an example, operations that necessitate utilization of central processing unit (CPU) resources (e.g., a number of CPU cycles), graphics processing unit resources (e.g., a number of GPU cycles), and/or memory resources (e.g., memory space) that exceeds a threshold value(s) can be offloaded to the on-premises server 120. Similarly, operations having a processing latency that can exceed a threshold value (e.g., that are not latency sensitive) can be offloaded to the on-premises server 120. Additionally or alternatively, operations performed at a frequency that is below a threshold value (e.g., not frequently performed) can be offloaded to the on-premises server 120. Additionally or alternatively, operations that necessitate power consumption that exceed a threshold value can be offloaded to the on-premises server 120.

In an example, the robot 110 can store a configuration table. The table can indicate, for each type of operation to be performed, whether the operation is to be performed locally to the robot 110 or remotely at the on-premises server 120. If remotely, the robot 110 can generate data needed for the operation and send this data along with a request to the on-premises server 120 indicating the operation. The on-premises server 120 can determine the corresponding process to execute and use the data as an input to the execution. The output of the execution can be sent as data to the robot 110.

As such, when the robot 110 receives operational instructions from the on-premises server 120, the robot 110 can determine which operations are to be performed locally or which ones are to be performed remotely. For the remote operations, the robot 110 can request their performance by the on-premises server 120 and receive back the results of the on-premises server 120 executing the corresponding operations. For the local operations, the robot 110 can execute the corresponding processes locally and can inform the on-premises server 120 of the results of these local operations (e.g., that a fastener hole was drilled at a particular location on the airplane 150). Next, the on-premises server 120 can update the top-tier server 130 such that the top-tier server 130 can maintain the truth source in association with the tail number of the airplane 150 and the operations performed thereat (or on the part thereof).

In an example, the on-premises server 120 can manage remote operations for multiple robots 110 at the same time. For instance, the on-premises server 120 can execute multiple processes, queue other processes, and/or simultaneously receive multiple requests. When multiple operations are to be supported, the on-premises server 120 can implement a prioritization scheme such that at least some of the processes can be executed sequentially depending on their priority. The priority scheme can consider the priority of each requested operations, where the operational priorities can be predefined. Additionally or alternatively, the priority scheme can consider the currently used resources and the remaining available resources of the on-premises server 120. Additionally or alternatively, the priority scheme can consider the inter-dependencies between the operations of one robot 110 or of multiple robots 110. Additionally or alternatively, the priority scheme can consider the various operations scheduled for a robot 100. These and other features of the priority scheme are further described herein below.

Although FIG. 1 illustrates a single on-premises server 120 and a single top-tier server 130, the embodiments of the present disclosure are not limited as such. For instance, the premises 140 can be used to manufacture and/or maintain airplanes or airplane parts for different airplane models. In this case, multiple on-premises servers can be housed on the premises 140 and multiple top-tier servers can be deployed. Each on-premises server can be associated with one of the airplane models. Likewise, each top-tier server can be associated with one of the airplane models. In this example, a robot 210 can support multiple airplane models. As such, when a remote operation needs to be performed for the robot 210 in association with an airplane of a particular airplane model (or an airplane part thereof), the robot can determine and select the on-premises server associated with that airplane model to then request this server to perform the operation. For instance, the server can store an association table indicating the associations between on-premises servers and airplane models and can use this table in its server determination and selection.

Although FIG. 1 illustrates a single on-premises server 120 deployed on the premises 140 and associated with an airplane model, the embodiments of the present disclosure are not limited as such. For instance, multiple on-premises servers 110 associated with the same airplane model can be distributed across the premises 140 (e.g., in different buildings or in different areas within a same building of the premises 140). In this case, when a remote operation needs to be performed for the robot 210 in association with an airplane of the airplane model (or an airplane part thereof), the robot can determine and select one of such on-premises servers to then request this server to perform the operation. The selection can be based on different factors. One factor can be location. For instance, the robot 210 can select the on-premises server that is closest thereto. In this illustration, the robot 210 can store location information indicating where each on-premises server is and can track its own location (e.g., via its navigation system) to then make the closest location determination and select the closes on-premises server. Using the closest on-premises server can reduce the network latency associated with performing the operation. Another factor can be server availability or business. For instance, the on-premises servers can broadcast periodically their availability or business to the robots 210. The robot 210 can then select an on-premises server that is available and not busy.

Figure 2:
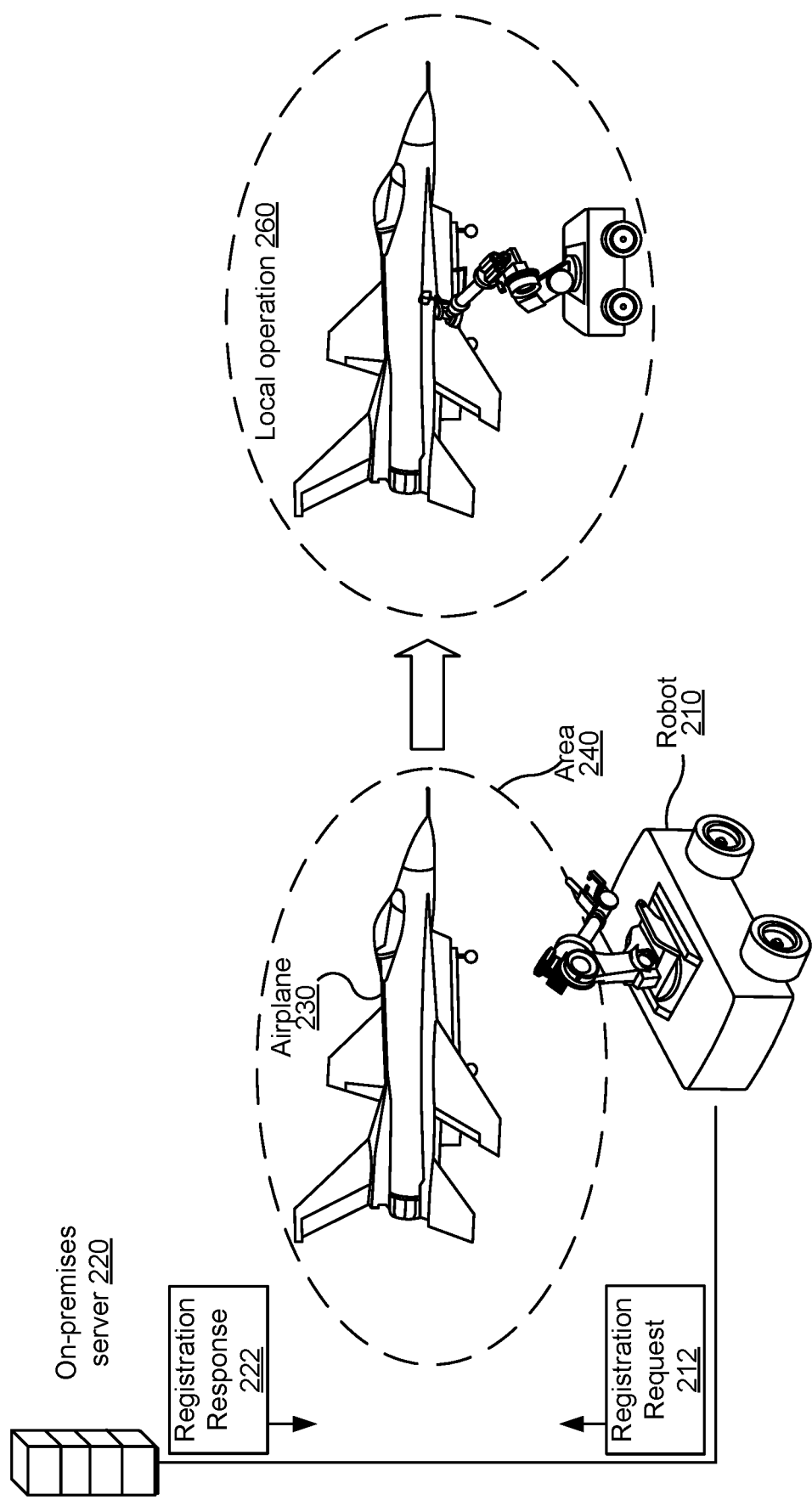
FIG. 2 illustrates an example of a distribution of compute between a robot and an on-premises server, according to some embodiments.

FIG. 2 illustrates an example of a distribution of compute between a robot 210 and an on-premises server 220, according to some embodiments. In the interest of clarity of explanation, the compute is described herein in connection with a robot-airplane registration operation in support of a drilling operation. However, the embodiments of the present disclosure are not limited as such and similarly apply to other types of operations. For instance, the on-premises server 220 can maintain a SLAM map of the premises and can provide portions thereof to the robot 210 such that the robot can use the SLAM map for its autonomous navigation.

Likewise, once the registration operation is performed, other types of operations can be performed locally to the robot 210 (such as a sealing operation, a cleaning operation, etc.).

In the illustration of FIG. 2, an airplane 230 of an airplane model is located in an area 240 of the premises. The on-premises server 220 is located on the premises and configured to support the airplane model. The robot 210 is deployed on the premises to perform different types of operations including airplane drilling operations.

The on-premises server 220 instructs the robot 210 to move to the area 240 and perform the drilling operation. For instance, the on-premises server 220 sends location data indicating the location of the airplane 230 (or the boundary of the area 240) and operational instructions indicating that fastener holes are to be drilled on the airplane 230.

Using its navigation system, the robot 210 tracks its location relative to the location data. Once arriving to the boundary of the area 240 (if this boundary is indicated by the location data or once the robot 210 detects it is within a threshold distance to the location of airplane 230 and can detect the airplane using at least one of its sensors), the robot 210 generates sensor data in support of the registration procedure. Different types of registration procedures are possible and use different types of sensor data.

In one example, the registration procedure involves an artificial neural network (ANN) model that performs cloud point matching. In this example, the robot 210 can generate and send, using a set of a light detecting and ranging (Lidar) sensors, a point cloud to the on-premises server 220. The point cloud corresponds to Lidar data generated for at least a portion of the airplane 230. Next, the on-premises server 220 can store and execute program code for the ANN model. Given the tail number of the airplane 230, the on-premises server 220 can determine a reference point cloud to be used (e.g., by retrieving it from a top-tier server based on the tail number). The on-premises server 220 can input the point cloud received from the robot 210 and the reference point cloud to the ANN model. The output of the ANN model can indicate a linear transformation between a reference point of the robot 210 and the airplane 230. The on-premises server 220 can send the data that defines the linear transformation, such as X, Y, Z locations and rotation along each axis, to the robot 210 that then localizes the airplane 230 in its coordinate system using the transformation. The origin of the coordinate system may be the reference point.

In another example, the registration procedure involves an ANN model that performs data-fused 3D object detection. For instance, using the Lidar system, the robot 210 can generate, from the point cloud, and send a three-dimensional model (3D) of at least a part of the airplane 230 to the on-premises server 220. In another illustration, using an RGB camera, can generate and send a two-dimensional (2D) model (e.g., a set of one or more 2D images), of at least a part of the airplane 230 to the on-premises server 220. Next in both of these illustrations, the on-premises server 220 can store and execute program code for the ANN model. Given the tail number of the airplane 230, the on-premises server 220 can determine a reference multi-dimensional model to be used (e.g., by retrieving a reference 3D model and/or a reference 2D model, as the case may be, from the top-tier server based on the tail number). The on-premises server 220 can input the data-fused representation(s) received from the robot 210 and the reference data-fused representation(s) to the ANN model. The output of the AI model can indicate a linear transformation between a reference point of the robot 210 and the airplane 230. The on-premises server 220 can send the data that defines the linear transformation, such as X, Y, Z locations and rotation along each axis, to the robot 210 that then localizes the airplane 230 in its coordinate system using the transformation. The origin of the coordinate system may be the reference point.

In yet another example, the registration procedure involves a computer vision (CV) algorithm that processes optical markers. For instance, using a camera system, the robot 210 can detect markers mounted to the airplane 230, and capture and send images showing the markers to the on-premises server 220. The on-premises server 220 can input the images to the CV algorithm that performs image processing to identify the markers and perform geometric reconstruction. The output of the CV algorithm can indicate a linear transformation between a reference point of the robot 210 and another reference point of the airplane 230. The on-premises server 220 can send the data that defines the linear transformation, such as X, Y, Z locations and rotation along each axis, to the robot 210 that then localizes the airplane 230 in its coordinate system using the transformation. The origin of the coordinate system may be one of the reference points.

In the above examples, the robot 210 can send a registration request 212 to the on-premises server 220 once it has captured the relevant sensor data. The registration request 212 can indicate that a registration of the airplane 230 to the robot 210 is needed. As such, the registration request 212 can include the airplane tail number, indicate the type of operation that is requested (e.g., a registration as in this illustrative use case), and include the sensor data (e.g., the point cloud, the data-fused representation(s), and/or the images, as the case may be).

The on-premises server 220 can receive the registration request 212 and process the sensor data by inputting it to the relevant model(s). The output(s) of the model(s) can be sent in a registration response 222 to the robot 210, thereby indicating the linear transformation between the robot 210 and the airplane 230.

Thereafter, using its navigation system, the robot 210 can move closer to the airplane 230 by tracking updates to the linear transformation between the two to then perform a local operation 260 on the airplane 230. The local operation 260 can include drilling holes through fasteners. For instance, the robot 210 can scan, using optical and/or sonic sensors, a surface of the airplane 230, detect drilling locations, generate a path over the surface, and generate a trajectory of its robotic arm to position its drilling end effector over each drilling location according to the path.

Here, in certain situations detecting drilling locations using the optical/sonic sensor data can be computationally complex. As such, this detection operation can be offloaded to the on-premises server 220 in another request thereto, where the request can include the optical and/or sonic sensors, indicate the airplane tail number, and indicate that the drilling location detection is requested. The on-premises server 220 can store program code for an ANN model trained to detect fastener positions that necessitate drilling operations. In these situations, the on-premises server can execute the program code, input the optical/sonic sensor data to the ANN model, and receive an output indicating the locations of the fastener holes from the ANN model. The on-premises server 220 can then send the location data to the robot 210.

In the above example too, generating a path to traverse the surface can be computationally complex. As such, this path generation operation can be offloaded to the on-premises server 220. Given the locations of the fastener holes, the on-premises server 220 can use a traveling salesman problem solver, or some other path optimization algorithm, to then generate an optimal path and send the path data to the robot 210.

In a further example, generating a trajectory in the real-world from the path to control the robotic arm and/or end effector can be computationally complex. As such, this trajectory generation operation can be offloaded to the on-premises server 220. Given the path to traverse, the states of the robot's joints, and models of the robotic arm and end effector (including inverse and forward kinematics models), the on-premises server 220 can generate the trajectory and send the trajectory data to the robot 210.

Figure 3:
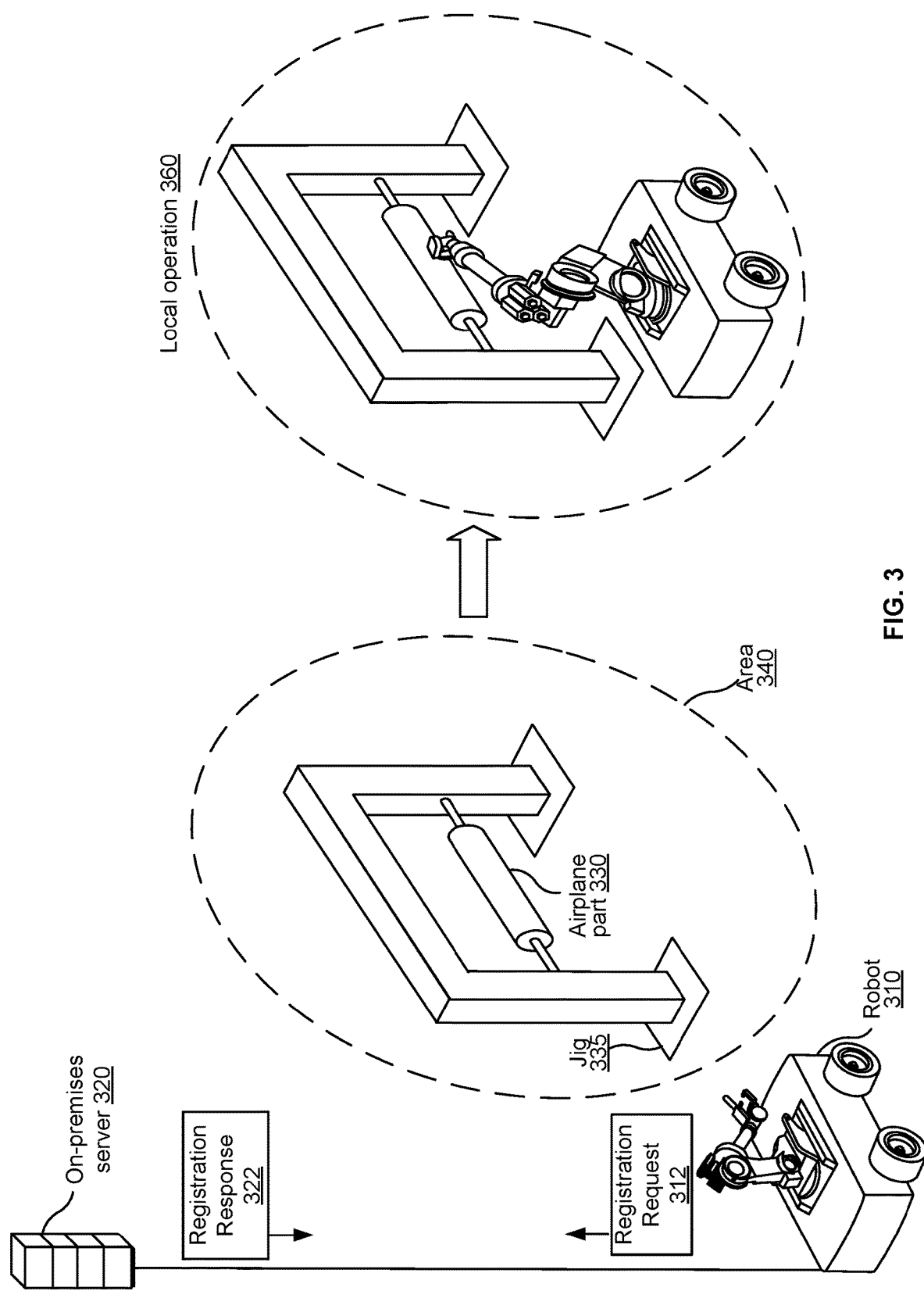
FIG. 3 illustrates another example of a distribution of compute between a robot and an on-premises server, according to some embodiments.

FIG. 3 illustrates another example of a distribution of compute between a robot 310 and an on-premises server 320, according to some embodiments. In the interest of clarity of explanation, the compute is described herein in connection with a robot-airplane part registration operation in support of a drilling operation. However, the embodiments of the present disclosure are not limited as such and similarly apply to other types of operations.

In the illustration of FIG. 3, an airplane part 330 of an airplane having an airplane model is located in an area 340 of the premises. In particular, the airplane part 330 is loaded to a jig 335 located in the area 340. The airplane part 340 can be a fuselage piece, an airplane wing, a tail portion, or any other portion of the airplane. The on-premises server 320 is located on the premises and configured to support the airplane model. The robot 310 is deployed on the premises to perform different types of operations including airplane drilling operations.

The on-premises server 320 instructs the robot 310 to move to the area 340 and perform the drilling operation. For instance, the on-premises server 320 sends location data indicating the location of the airplane part 330 (or the boundary of the area 340) and operational instructions indicating that fastener holes are to be drilled on the airplane part 330. Alternatively, the location data indicates an identifier the jig 350. The robot 310 can store a table indicating the location of the jig 350 and that the jig 350 is associated with drilling hole operations. As such, the on-premises server 320 may merely instruct the robot 310 to move to an area and provide the identifier of the jig 350.

Using its navigation system, the robot 310 tracks its location relative to the location data. Once arriving to the boundary of the area 340 (if this boundary is indicated by the location data or once the robot 310 detects it is within a threshold distance to the location of airplane part 330 or the jig 350 and can detect the airplane part 330 and/or the jig 335 using at least one of its sensors), the robot 310 generates sensor data in support of the registration procedure. Different types of registration procedures are possible and use different types of sensor data.

In one example, the registration procedure involves an ANN model that performs cloud point matching. In this example, the robot 310 can generate and send, using a set of a light detecting and ranging (Lidar) sensors, a point cloud to the on-premises server 320. The point cloud corresponds to Lidar data generated for at least a portion of the airplane part 330. Next, the on-premises server 320 can store and execute program code for the ANN model. Given the tail number of the airplane and/or a part number of the airplane part 330, the on-premises server 320 can determine a reference point cloud to be used (e.g., by retrieving it from a top-tier server based on the tail number and/or part number). The on-premises server 320 can input the point cloud received from the robot 310 and the reference point cloud to the ANN model. The output of the ANN model can indicate a linear transformation between a reference point of the robot 310 and another reference point of the airplane part 330. The on-premises server 320 can send the data that defines the linear transformation, such as X, Y, Z locations and rotation along each axis, to the robot 310 that then localizes the airplane 330 in its coordinate system using the linear transformation. The origin of the coordinate system may be the reference point.

In another example, the registration procedure involves an ANN model that performs data fused 3D object detection. For instance, using the Lidar system, the robot 310 can generate, from the point cloud, and send a three-dimensional model (3D) of at least a portion of the airplane part 330 to the on-premises server 320. In another illustration, using an RGB camera, can generate and send a two-dimensional (2D) model (e.g., a set of one or more 2D images), of at least a portion of the airplane part 330 to the on-premises server 320. Next in both of these illustrations, the on-premises server 320 can store and execute program code for the ANN model. Given the tail number and/or the part number, the on-premises server 320 can determine a reference data-fused representation to be used (e.g., by retrieving a reference 3D model and/or a reference 3D model, as the case may be, from the top-tier server based on the tail number). The on-premises server 320 can input the data-fused representation(s) received from the robot 310 and the reference data-fused representation(s) to the ANN model. The output of the ANN model can indicate a linear transformation between a reference point of the robot 310 and another reference point of the airplane part 330. The on-premises server 320 can send the data that defines the linear transformation, such as X, Y, Z locations and rotation along each axis, to the robot 310 that then localizes the airplane part 330 in its coordinate system using the linear transformation. The origin of the coordinate system may be one of the reference points.

In yet another example, the registration procedure involves a CV algorithm that processes optical markers. For instance, using a camera system, the robot 310 can detect markers mounted to the airplane part 330, and generate and send images showing the markers to the on-premises server 320. The on-premises server 320 can input the images to the CV algorithm that performs image processing to identify the markers and perform geometric reconstruction. The output of the ACV algorithm can indicate a linear transformation between a reference point of the robot 310 and another reference point of the airplane part 330. The on-premises server 320 can send the data that defines the linear transformation, such as X, Y, Z locations and rotation along each axis, to the robot 310 that then localizes the airplane part 330 in its coordinate system using the linear transformation. The origin of the coordinate system may be one of the reference points.

In a further example, the jig 350 can include positioning surfaces at different locations thereof. Using optical, distance, and/or range sensors, the robot 310 can generate sensor data indicating relative distance and angle relative to the positioning surfaces. The on-premises server 320 can input such sensor model to a position algorithm that, given a part number of the jig 350, can output a linear transformation between a reference point of the robot 310 and another reference point of the jig 350. The on-premises server 320 can send the data that defines the linear transformation, such as X, Y, Z locations and rotation along each axis, to the robot 310 that then localizes the jig 350 in its coordinate system using the linear transformation. The origin of the coordinate system may be one of the reference points.

In the above examples, the robot 310 can send a registration request 312 to the on-premises server 320 once it has generated the relevant sensor data. The registration request 312 can indicate that a registration of the airplane part 330 to the robot 310 is needed. As such, the registration request 312 can include the airplane tail number and/or the airplane part number, indicate the type of operation that is requested (e.g., a registration as in this illustrative use case), and include the sensor data (e.g., the point cloud, the multi-dimensional model(s), and/or the images, as the case may be).

The on-premises server 320 can receive the registration request 312 and process the sensor data by inputting it to the relevant model(s). The output(s) of the model(s) can be sent in a registration response 322 to the robot 310, thereby indicating the linear transformation between the robot 310 and the airplane part 330 (and/or the robot 310 and the jig 350).

Thereafter, using its navigation system, the robot 310 can move closer to the airplane part 330 by tracking updates to the linear transformation to then perform a local operation 360 on the airplane 330. The local operation 360 can include drilling holes through fasteners. For instance, the robot 310 can scan, using optical and/or sonic sensors, a surface of the airplane part 330, detect drilling locations, generate a path over the surface, and generate a trajectory of its robotic arm to position its drilling end effector over each drilling location according to the path.

Here, in certain situations detecting drilling locations using the optical/sonic sensor data can be computationally complex. As such, this detection operation can be offloaded to the on-premises server 320 in another request thereto, where the request can include the optical and/or sonic sensors, indicate the airplane tail number and/or airplane part number, and indicate that the drilling location detection is requested. The on-premises server 320 can store program code for an ANN model trained to detect fastener holes that necessitate drilling operations. In these situations, the on-premises server can execute the program code, input the optical/sonic sensor data to the ANN model, and receive an output indicating the locations of the fastener holes from the ANN model. The on-premises server 320 can then send the location data to the robot 310.

In the above example too, generating a path to traverse the surface can be computationally complex. As such, this path generation operation can be offloaded to the on-premises server 320. Given the locations of the fastener holes, the on-premises server 320 can use a traveling salesman problem solver, or some other path optimization algorithm, to then generate an optimal path and send the path data to the robot 310.

In a further example, generating a trajectory in the real-world from the path to control the robotic arm and/or end effector can be computationally complex. As such, this trajectory generation operation can be offloaded to the on-premises server 320. Given the path to traverse and models of the robotic arm and end effector (including inverse and forward kinematics models), the on-premises server 320 can generate the trajectory and send the trajectory data to the robot 310.

Although not illustrated in FIG. 3, a jig device can be located at the jig 350 (e.g., being mounted to the jig 250, integrated in the jig 350, or being installed in proximity to the jig and within the area 340). The jig device can include a set of user interfaces to indicate an output to an operator and/or receive an input of the operator. An example input/output user interface can be a graphical user interface that supports touchscreen technology. An example output user interface is a light source that emits different light colors to provide different notification. An example input example user interface is a push button or an activation device to indicate that the airplane part 330 was loaded to the jig 350.

The on-premises server 320 can be communicatively coupled with the jig device (e.g., using wireless communications that are protected with encryption). The on-premises server 320 can send operational instructions to the jig device to indicate that the airplane part 330 is to be loaded and/or to indicate a robot operation(s) to be performed on. Some or all of the operational instructions can be presented by the jig device to the operator. Once the airplane part 330 is loaded to the jig, the operator can operate the jig device to indicate the completion of this loading. The jig device can send data to on-premises server 320 indicating that the airplane part 330 is now installed. The on-premises server 320 can send corresponding data to a top-tier server indicating the loading, the airplane part number, the jig's 350 identifier, and/or the jig location. The top-tier server can store such information in its truth source. Depending on the EMS implementation, the top-tier server can send instructions about the drilling operation to the on-premises server 320 or the on-premises server 320 itself can generate such operational instructions. In both cases, the drilling operational instructions are sent to the robot 310, resulting in the robot 310 being summoned to the area 340. In other words, before summoning the robot 310 to the area 340, the on-premises server 320 can communicate with the jig device to instruct the operator and receive a confirmation that the airplane part 330 was loaded to then instruct the robot 310 about its operations.

Figure 4:
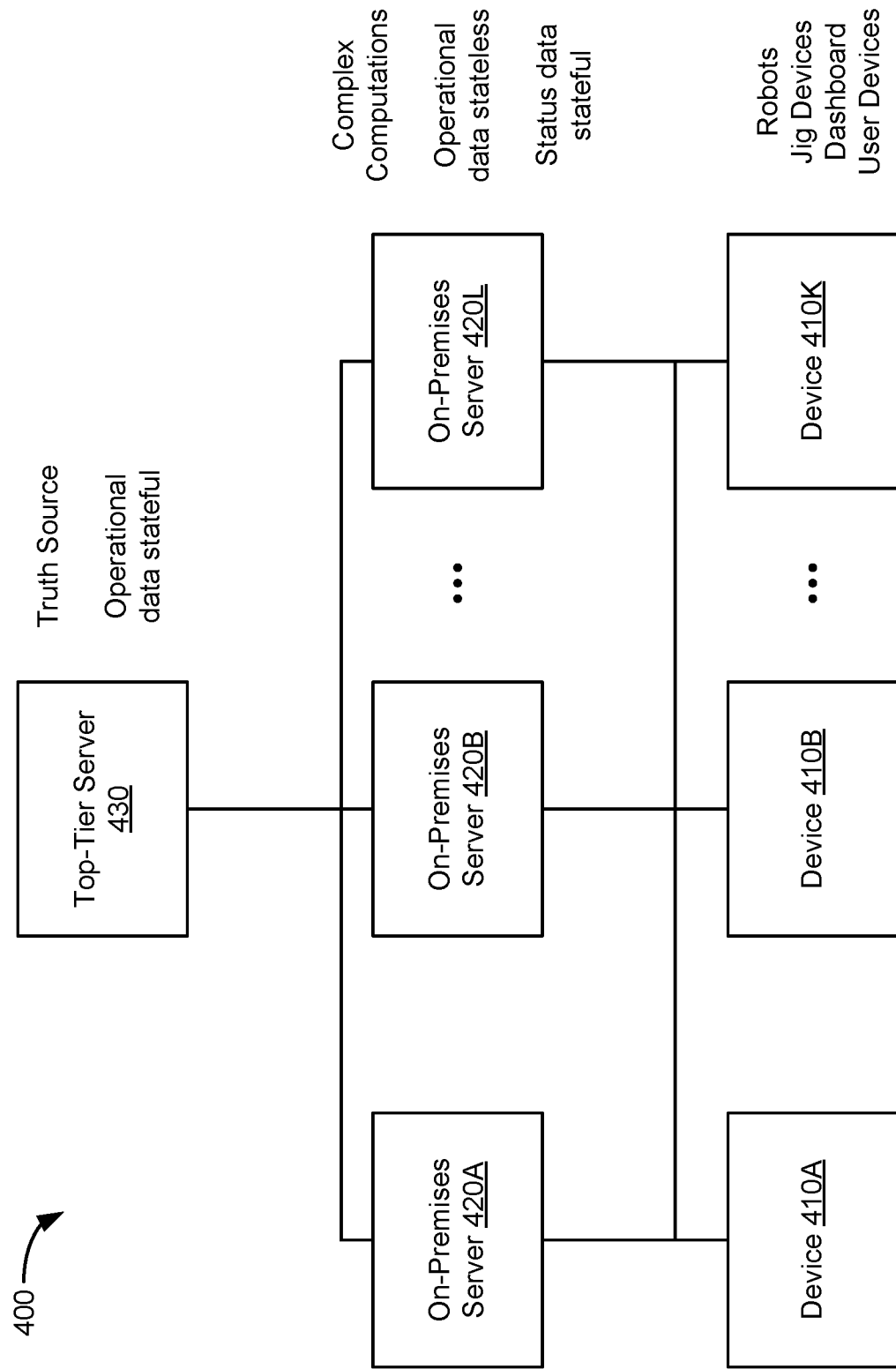
FIG. 4 illustrates an example of a hierarchy of compute resources, according to some embodiments.

FIG. 4 illustrates an example of a hierarchy 400 of compute resources, according to some embodiments. At the lowest level, the hierarchy 400 includes a set of devices 410A, 410B, through 410K (generally referred to as devices 410). At the next level up, the hierarchy 400 includes a set of on-premises servers 420A, 420B, through 420L (generally referred to as on-premises servers 420). At the highest level, the hierarchy 400 includes a top-tier server 430.

Whereas the devices 410 can be used in support of multiple airplane models, the on-premises servers 420 and the top-tier server 430 are associated with a single airplane model. For example, the on-premises servers 420 and the top-tier server 430 are configured with program code and deployed with various security and access controls to support that particular airplane model.

The devices 410 can include robots and other types of devices, such as jig devices, dashboard devices (e.g., devices to show manufacturing and/or maintenance operations using a dashboard format), and user devices (e.g., computing devices assigned to and used by operators, such as ones used in manual processes including a process to scan an airplane part or an entire airplane from which scanned data can be used to generate a data-fused representation of the airplane part or the airplane). Generally, the devices 410 can be located on a particular premises. Each of these devices 210 can communicate with one or more of the on-premises server(s) 420, also located on the premises. A device 410 can implement a set of rules to determine which on-premises server(s) 420 the device 410 should communicate with. For instance, the set of rules can use different factors, including location factors, latency factors, availability factors, and/or business factors to indicate the on-premises server(s) 420 to use.

Each on-premises server 420 can be configured to perform complex computations for each or some of the device 410. For instance, referring back to the examples of FIGS. 2 and 3, each on-premises server 420 can be configured to execute a robot-to-airplane registration program code, and a robot-to-airplane part registration program code, a path generation program code, a trajectory planning program code, and to provide a portion of a SLAM map to a robot. Further, the on-premises servers 420 may be stateless vis-à-vis the operational data generated by the devices 410. For instance, if a robot indicates to an on-premises server 420 that an operation was performed, the on-premises server 420 does not permanently store the corresponding operational data. Instead, the on-premises server 420 sends this data to the top-tier server 430 for storage by the top-tier server 430. Nonetheless, the on-premises servers 420 may be stateful vis-à-vis the status of each device 410. For instance, each on-premises server 420 can store status data indicating whether a robot is available, busy, or unavailable.

The top-tier server 430 can be the truth source for different operations to be performed on an airplane part and/or an airplane of the airplane model. For instance, the top-tier server 430 maintains a database of usable reference models. In the same database or a different database, the top-tier server 430 stores data indicating operations that have been performed and/or to be performed on airplane part per part number or airplane per tail number. Further, the top-tier server may be stateful vis-à-vis the operations performed by the devices 410.

In an example, the top-tier server 430 is configured to provide EMS services. Alternatively, some or all of the on-premises server 420 are configured to provide EMS services. In yet another example, the EMS services are distributed between the top-tier server 430 and some or all of the on-premises server 420.

Figure 5:
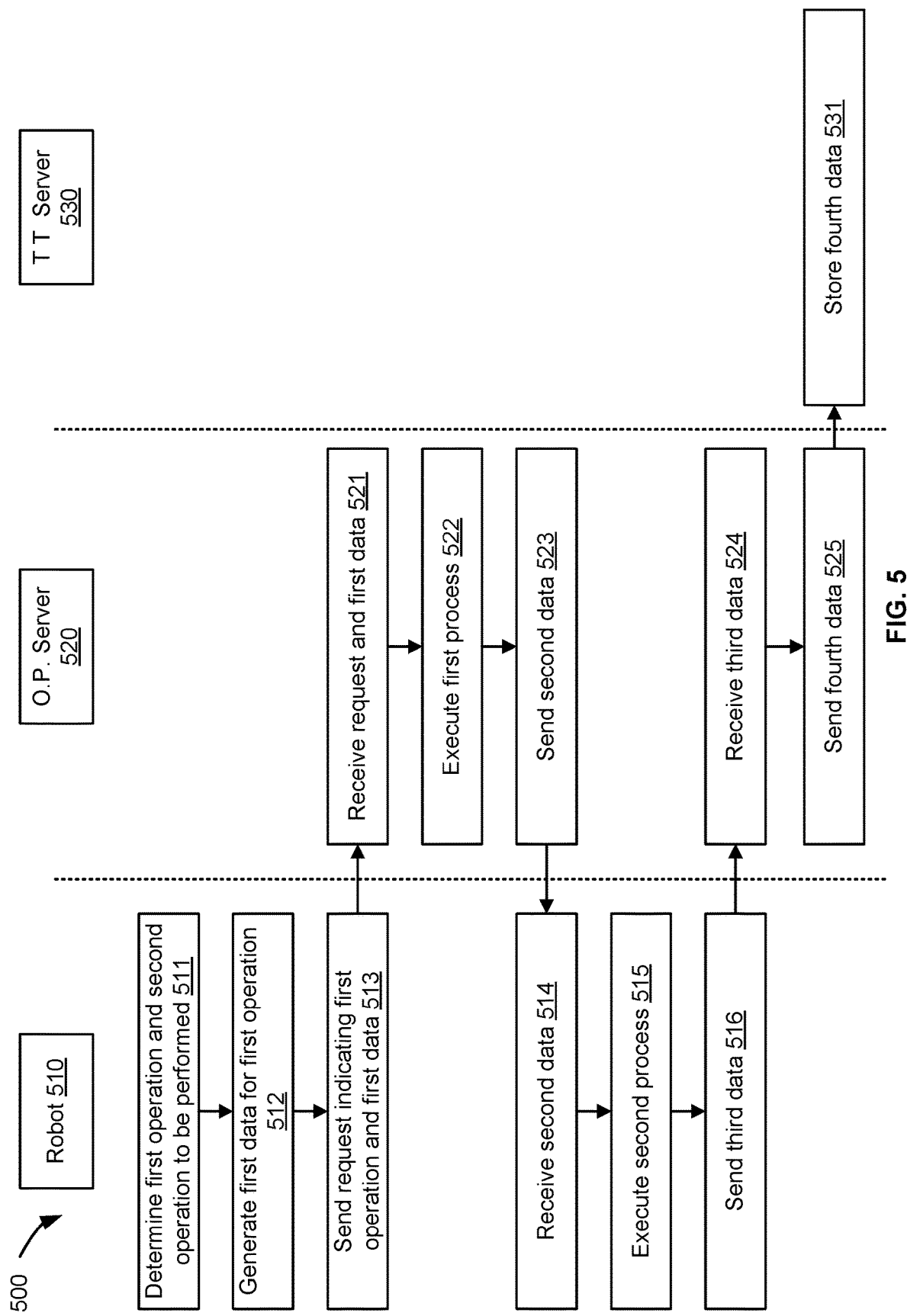
FIG. 5 illustrates an example of a flow for using different resources to balance compute for robotic operations, according to some embodiments.

FIG. 5 illustrates an example of a flow 500 for using different resources to balance compute for robotic operations, according to some embodiments. The flow 500 is executed by a system that includes a robot 510, an on-premises server 520, and a top-tier server 530. Some or all of the instructions for performing the steps of the flow 500 can be implemented as hardware circuitry and/or stored as computer-readable instructions on a non-transitory computer-readable medium of computer systems of the robot 510, the on-premises server 520, and the top-tier server 530. As implemented, the instructions represent modules that include circuitry or code executable by processors of the computer systems. The use of such instructions configures the computer systems to perform the specific steps described herein. Each circuitry or code in combination with the relevant processor(s) represent a means for performing a respective step(s). While the steps are illustrated in a particular order, it should be understood that no particular order is necessary and that one or more steps may be omitted, skipped, performed in parallel, and/or reordered.

The flow 500 can include a step 511, where the robot 510 determines that a first operation and a second operation are to be performed. Each of these two operations can be an autonomous operation related to an airplane part or an airplane of a particular airplane part. The first operation may be offloaded to the on-premises server 520, whereas the second operation can be local to the robot. The on-premises server 520 can support operations associated with the airplane part. In an example, the two operations are determined by receiving, from the on-premises server 520, operational instructions that identify the airplane part, the airplane, a jig where the airplane part is loaded, and/or the types of the two operations. In another example, this determination is performed by receiving, at a user interface of the robot 510, an operator input indicating the airplane part, the airplane, the jig, and/or the types of the two operations.

The flow 500 can include a step 512, where the robot 510 generates first data for the first operation. In an example, the robot 510 determines that the first operation is to be offloaded to the on-premises server. This determination can be based on a configuration table stored by the robot 510, where this table indicates that for certain types of operations, the offloading is needed. Using one or more sensors of the robot 510, the robot 510 generates the first data (e.g., Lidar data, image data, etc.).

The flow 500 can include a step 513, where the robot 510 sends a request and the first data to the on-premises server 520, where the request indicates the first operation. For instance, the request includes the first data and indicates the type of operation that is requested.

The flow 500 can include a step 521, where the on-premises server 520 receives the request and the first data. For instance, the request and the first data are received over a communications channel between the robot 510 and the on-premises server 520.

The flow 500 can include a step 522, where the on-premises server 520 executes a first process that corresponds to the first operations. In an example, the on-premises server 520 stores a configuration table that associates types of operations with program codes. Based on the request, the on-premises server 520 determines a set of program codes that are associated with the type of the first operation and executes these program codes as the first process. The on-premises server 520 provides the first data as input to the executed program code(s).

The flow 500 can include a step 523, where the on-premises server 520 sends second data to the robot 510. For instance, the second data corresponds to the output of the program code execution.

The flow 500 can include a step 514, where the robot 510 receives the second data. For instance, the second data is received over the communications channel between the robot 510 and the on-premises server 520 as a response to the request.

The flow 500 can include a step 515, where the robot 510 executes a second process. In an example, the robot 510 stores a configuration table that associates types of operations with program codes. The robot 510 determines a set of program codes that are associated with the type of the second operation and executes these program codes as the second process. The robot 510 provides the second data as input to the executed program code(s). For instance, referring back to the registration operation and a drilling operation, the first operation can be a registration operation, and the second operation can be the drilling operation. As such, once the linear transformation (e.g., an example of the second data) is available to the robot 510, the robot can execute program code for controlling its robotic arm and its end effector to drill holes.

The flow 500 can include a step 516, where the robot 510 sends third data to the on-premises server. The third data can indicate the performance of the second operation (e.g., that a fastener hole was drilled and the location of the drilling).

The flow 500 can include a step 524, where the on-premises server 520 receives the third data. For instance, the third data is received over the communications channel between the robot 510 and the on-premises server 520.

The flow 500 can include a step 524, where the on-premises server 520 sends fourth data to the top-tier server 530, where the fourth data corresponds to the third data. For instance, the fourth data can indicate the performance of the second operation (e.g., that a fastener hole was drilled and the location of the drilling), the timing of the operation, the airplane part number, the airplane tail number, the robot's 510 identifier, the location where the airplane part or airplane was at time of operation, the identifier of the jig where the airplane part was mounted (if any), and/or other relevant operational data.

The flow 500 includes a step 531, where the top-tier server 530 stores the fourth data. For instance, the top-tier server 530 maintains a database as part of the truth source for the airplane model. The fourth data can be stored in association with the airplane part number and/or airplane tail number in the database.

Figure 6:
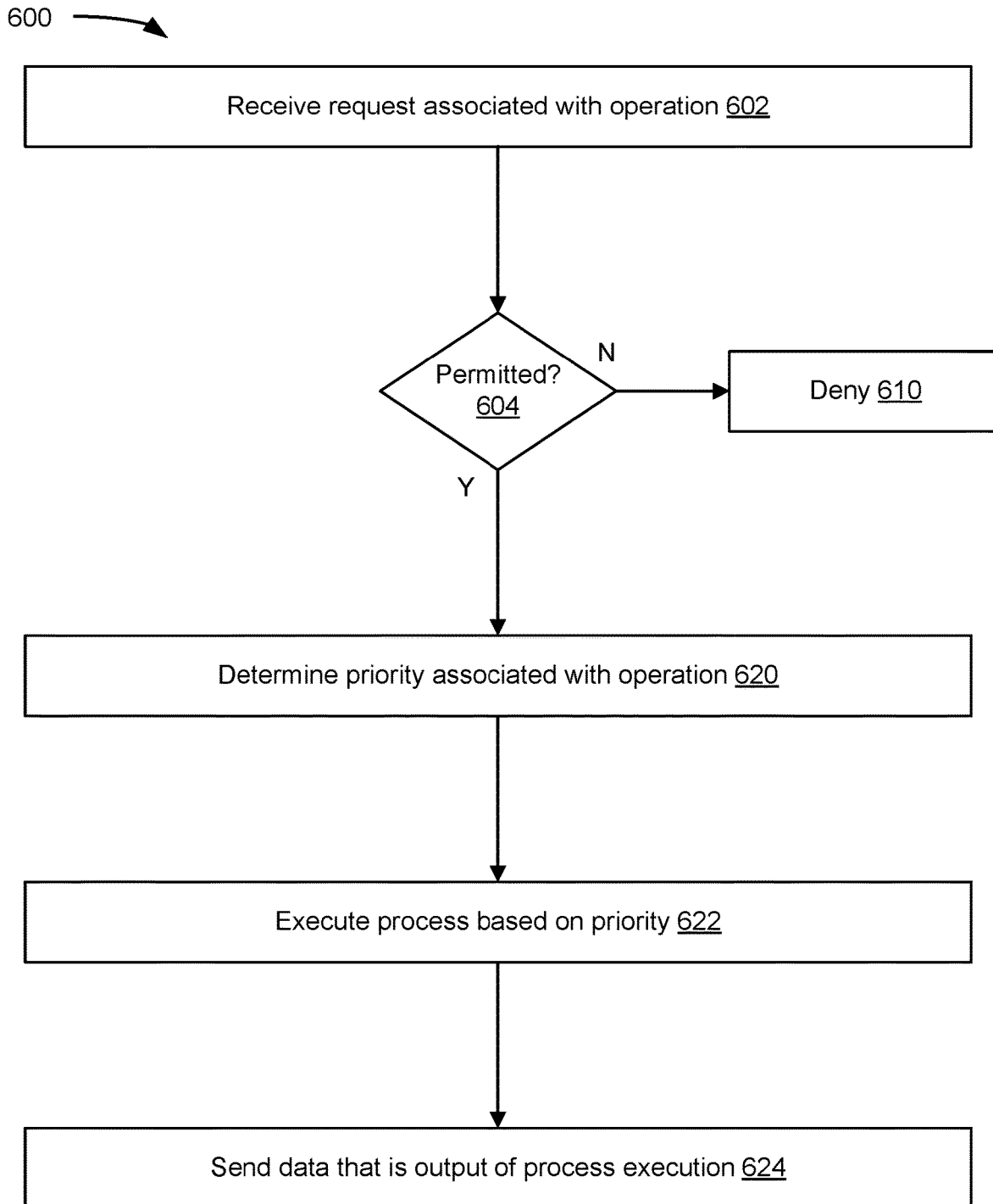
FIG. 6 illustrates an example of a flow for processing a request of a robot, according to some embodiments.
Figure 7:
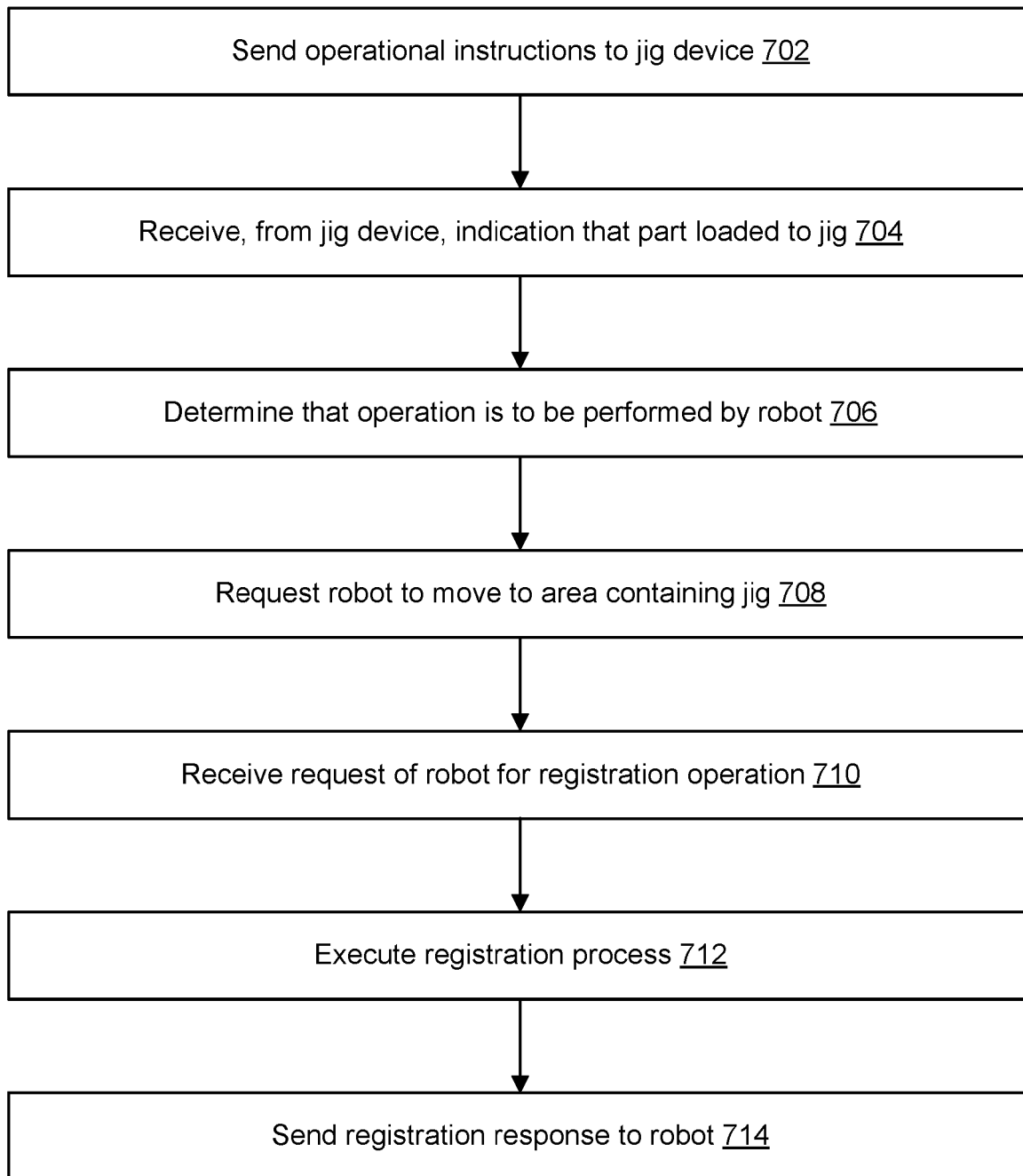
FIG. 7 illustrates an example of a flow for distributing a compute operation, according to some embodiments.
Figure 8:
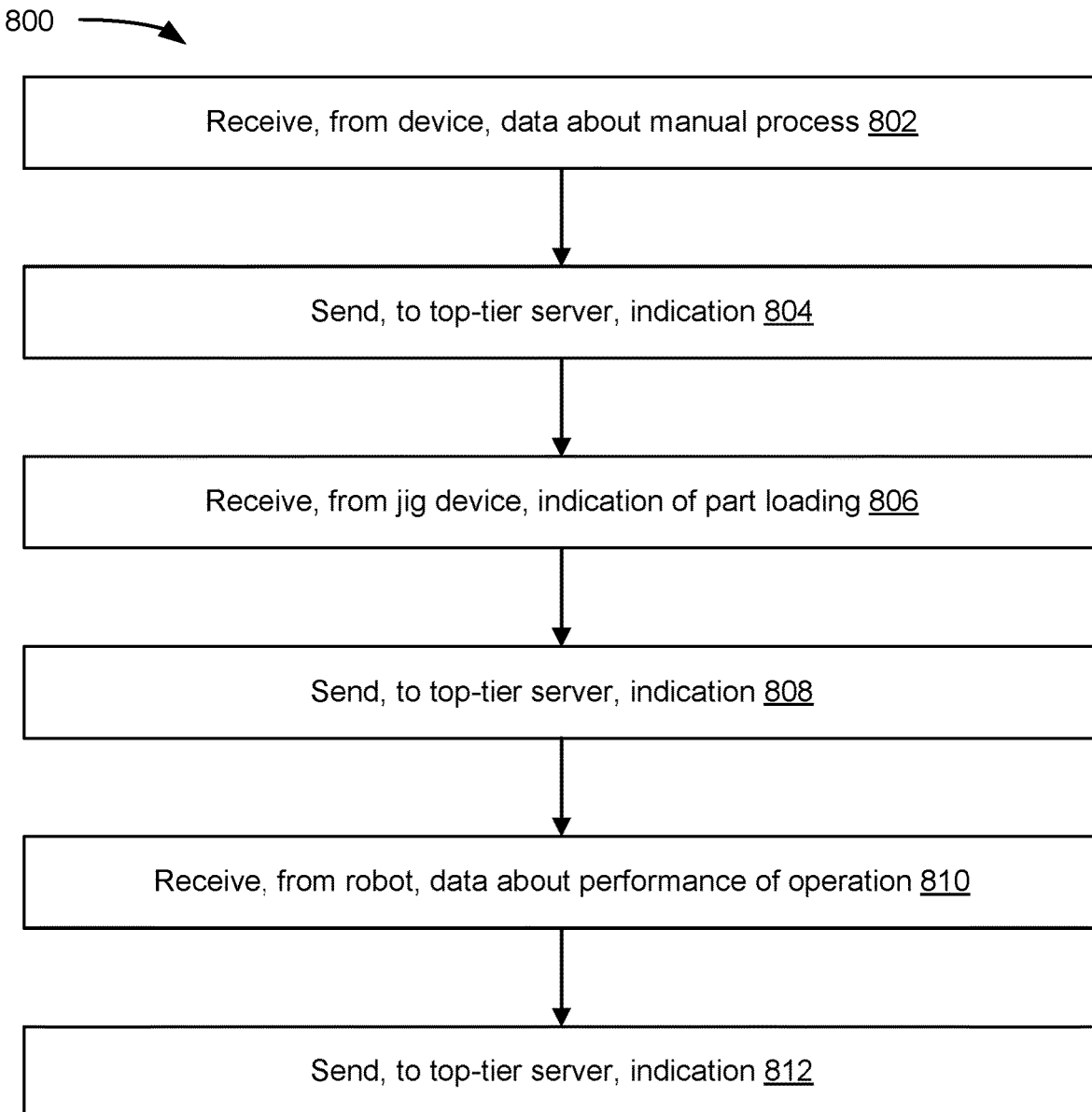
FIG. 8 illustrates an example of a flow for updating a truth source, according to some embodiments.

FIGS. 6-8 illustrate flows executable by an on-premises server. Some or all of the instructions for performing the steps of the flows can be implemented as hardware circuitry and/or stored as computer-readable instructions on a non-transitory computer-readable medium of a computer systems of the on-premises server. As implemented, the instructions represent modules that include circuitry or code executable by processors of the computer system. The use of such instructions configures the computer system to perform the specific steps described herein. Each circuitry or code in combination with the relevant processor(s) represent a means for performing a respective step(s). While the steps are illustrated in a particular order, it should be understood that no particular order is necessary and that one or more steps may be omitted, skipped, performed in parallel, and/or reordered.

FIG. 6 illustrates an example of a flow 600 for processing a request of a robot, according to some embodiments. In an example, the flow 600 includes a step 602, where the on-premises server receives a request associated with an operation. For instance, the request is received from the robot and indicates a type of operation to be performed by the on-premises server for the robot, an airplane part number, and airplane tail number, and/or a location of the robot. The request can also include sensor data generated by the robot and usable to perform the operation. The request can be received in an application programming interface (API) call from the robot.

In an example, the flow includes a step 604, where the on-premises server determines whether the request is permitted or not. Different factors can be used to make this determination including, for instance, the airplane model, the type of the operation, the timing of the operation, and/or the type of the robot. For instance, if the airplane part number or the airplane tail number indicated by the request are associated with an airplane model that is associated with the on-premises server, the request is permitted; otherwise, the request is denied. If the type of operation is supported by the on-premises server for the type of the robot, the request is permitted; otherwise, the request is denied. If the operation depends on another operation, then based on the status of the other operation, the request can be permitted or denied. For instance, if the operation depends on the airplane part being loaded to a jig and if a jig device has indicated that the airplane part has already been loaded, the request is permitted; otherwise, the request is denied. The on-premises server can perform the permission determination locally or can query the top-tier server to make the determination and return the permission or denial. For a local determination, the on-premises server can query the top-tier server to receive the needed data for the determination, such as the type of operation to be performed on the airplane part or airplane, the type of robot to be used, the timing of the operation, the dependency of the operation on other operations and the status of such other operations, and the like.

In an illustrative use case, the operation relates to an airplane part that is to be loaded to a jig. In this case, the on-premises server can receive from a device located at the jig, an indication of a loading of the airplane part to the jig, determine that the request was received after the indication is received, and determine that the request is permitted based on the request being received after the indication is received.

In the above illustrative use case, the permission determination is local to the on-premises server. For instance, the on-premises server receives, from the top-tier server, a set of operational instructions associated with the airplane part, and determines, based on the set of operational instructions, that the operation is to be performed after the loading of the airplane part to the jig. The on-premises server may have sent, to the top-tier server, data indicating the loading of the airplane part to the jig. The set of operational instructions may have been received based on this data.

In another illustrative use case, the operation relates to an airplane part or an airplane independently of the use of a jig. In this use case, the on-premises server determines that the request is permitted based on a timing of the request, a type of the robot, and a dependency of the operation to one or more other operations to be performed on the airplane part or airplane.

In another illustrative use case, the permission determination involves the top-tier server. In this case, the on-premises server queries, based on the request, the top-tier server whether the operation is to be performed or not, and receiving, from the top-tier server, an indication that the operation is to be performed.

In an example, the flow includes a step 610, where the on-premises server denies the request. This step 610 follows step 604 upon a determination to deny the request. In this case, the on-premises server can ignore the request or can send a response to the robot indicating that the request is denied. The response can be sent in an API response.

In an example, the flow includes a step 620, where the on-premises server determines a priority associated with the operation. This step 620 follows step 604 upon a determination to permit the request. A priority scheme can be executed locally to the on-premises server to determine the priority. Alternatively, the on-premises server can make an API call to the top-tier server to then receive the priority. In both situations, the priority can be determined using a number of factors, such as processes that are being executed or that are queued for execution by the on-premises server, the timing of when the operation needs to be performed (where this timing data can be included in the request of the robot), a priority table associating priorities with types of operations, operations to be performed by the robot after this operation, and/or dependency of this operation with other operations to be performed by the robot or other devices (e.g., a jig) and the status of such operations.

In an illustrative use case, the on-premises server determines a process that corresponds to the operation and determines a priority associated with executing the process based on other processes that are associated with the airplane model and that are being executed by the on-premises server for other robots located on the premises.

In another illustrative use case, the on-premises server determines a process that corresponds to the operation and determines a priority associated with executing the process based on timing information included in the request and associated with the operation.

In a further illustrative use case, the on-premises server determines a process that corresponds to the operation and determines a priority associated with executing the process based on a type of the operation and a priority table.

In yet another illustrative use case, the on-premises server determines that a different operation to be performed on the same airplane part or on a different portion of the airplane by the robot or by another device located within the premises, and determines a priority of the process based on the different operations.

In a further illustrative use case, the on-premises server receives from a device located with the premises, another request for a different operation to be performed by the device. The device can be the same as or different from the robot (e.g., can be a jig device). The on-premises server determines an inter-dependency between the two operations, determines an execution status of another process associated with the different operation, and determines a priority associated with executing the process based on the execution status.

In an example, the flow includes a step 622, where the on-premises server executes the process based on the priority. For instance, the operation is queued, and the queue is updated over time. Once the queue indicates that the operation should be performed, the on-premises server executes the process.

In an example, the flow includes a step 624, where the on-premises server sends data that is an output of executing the process. For instance, the data is sent to the robot in an API response. The data can also be sent to the top-tier server in an API call to update the truth source.

FIG. 7 illustrates an example of a flow 700 for distributing a compute operation, according to some embodiments. In an example, the flow 700 includes a step 702, where the on-premises server sends operational instructions to a jig device. The operational instructions, or a subset thereof, can be presented by the jig device (e.g., via a user interface thereof) to instruct an operator about loading an airplane part to a jig.

In an example, the flow 700 includes a step 704, where the on-premises server receives, from the jig device, an indication of the loading of the part to the jig. For instance, the operator can input at the user interface information about the airplane part being loaded to the jig and/or the jig device can detect the loading based on sensor data. In response, the jig device can send the indication to the server.

In an example, the flow 700 includes a step 706, where the on-premises server determines that an operation is to be performed on the airplane part by a robot. For instance, an EMS services can be executing (locally on the on-premises server or remotely on the top-tier server) and indicate a type of operation to be performed and, optionally, the type of robot or the robot to perform the operation. If only the type of operation is indicated, the on-premises server can determine status data and capability data of robots and selects the robot given that its status data indicates that it is available, and its capability data indicates that it is capable of supporting the operation.

In an example, the flow 700 includes a step 708, where the on-premises server requests the robot to move to an area containing the jig. For instance, the on-premises server sends a request to the robot indicating the operation to be performed and including location data. The location data can be a location of the jig, a location on a boundary of the area, or an identifier of the jig (which the robot can translate into a jig location).

In an example, the flow 700 includes a step 710, where the on-premises server receives a request from the robot for a registration operation. The request can indicate that the registration operation needs to be performed and can include sensor data generated by the robot for the registration.

In an example, the flow 700 includes a step 712, where the on-premises server executes a registration process that corresponds to the registration operation. For instance, the on-premises server determines that the request is permitted and a related priority. Based on the priority, the on-premises server executes the registration process.

In an example, the flow 700 includes a step 714, where the on-premises server sends a registration response to the robot. This response can include linear transformation between the robot and the jig and/or airplane part.

FIG. 8 illustrates an example of a flow 800 for updating a truth source, according to some embodiments. In an example, the flow 800 includes a step 802, where the on-premises server receives, from a device, data about a manual process. For instance, the device can be a handheld scanner or other type of operator device used to scan a surface of an airplane or perform non-destructive inspection of the airplane. The data can include sensor data generated by one or more sensors of the device. The on-premises server can execute various program codes (e.g., including program codes of AI models) to process the data (e.g., to determine fasteners and fastener holes, to determine cracks or other maintenance items on the surface of the airplane, to generate a multi-dimensional model (e.g., 3D CAD model) of the airplane or airplane part, to generate point cloud of the airplane or airplane part and the like). Alternatively, the processing can be performed at the top-tier server, in which the on-premises server can act as a relay node to send the sensor data to the top-tier server.

In an example, the flow 800 includes a step 804, where the on-premises server sends an indication of the data received from the device to the top-tier server. For instance, the indication can include the output of the processing and the sensor data, or merely the sensor data.

In an example, the flow 800 includes a step 806, where the on-premises server receives, from a jig device, an indication of a part loading. This step can be similar to step 704.

In an example, the flow 800 includes a step 808, where the on-premises server sends an indication about the part loading to the top-tier server. For instance, the indication can include data identifying the airplane part, the jig, the jig's location, and the timing of the loading.

In an example, the flow 800 includes a step 810, where the on-premises server receives, from a robot, data about performance of an operation on the airplane part. For instance, the robot may have been instructed to perform this operation. In response, the on-premises server can receive operational data indicating various parameters of the operation, such as locations on the airplane part of where the operation was performed (e.g., where fastener holes were drilled), timing information, and the like.

In an example, the flow 800 includes a step 812, where the on-premises server sends, to the top-tier server, an indication about the performance. For instance, the operational data can be passed to the top-tier server along with an identifier of the robot.

Figure 9:
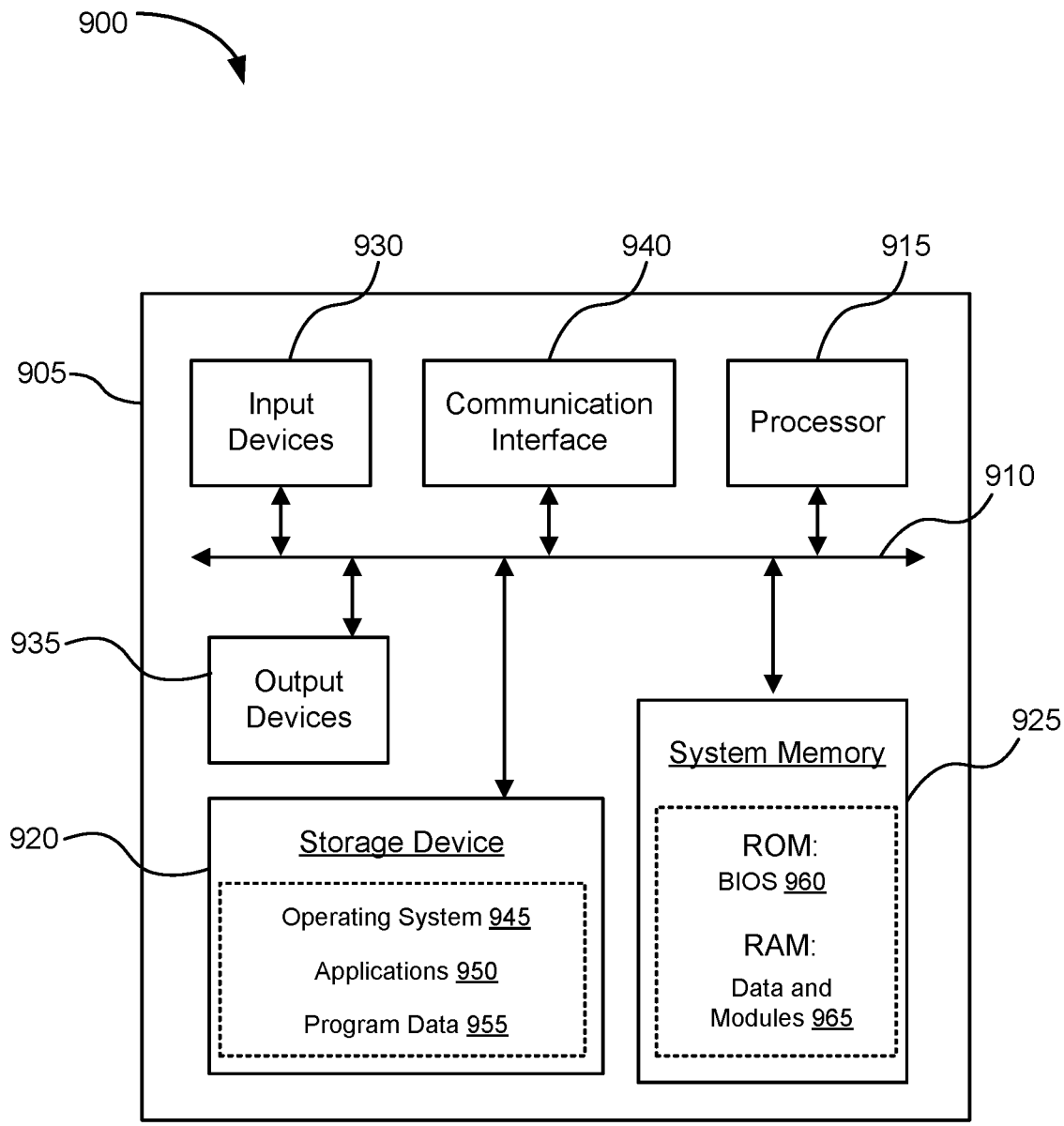
FIG. 9 illustrates an example of components of a computer system, according to some embodiments.

FIG. 9 illustrates an example of components of a computer system 900, according to some embodiments. The computer system 900 can be implemented as a component of a robot (or any low-tier device), an on-premises server, and/or a top-tier server. As shown in FIG. 9, the computer system 900 may include a bus 910, processor 915, a storage device 920, a system memory (hardware device) 925, one or more input devices 930, one or more output devices 935, and a communication interface 940.

The bus 910 permits communication among the components of computer system 900. For example, bus 910 may be any of several types of bus structures including a memory bus or memory controller, a peripheral bus, and a local bus using any of a variety of bus architectures to provide one or more wired or wireless communication links or paths for transferring data and/or power to, from, or between various other components of computer system 900.

The processor 915 may be one or more processors, microprocessors, or specialized dedicated processors that include processing circuitry operative to interpret and execute computer-readable program instructions, such as program instructions for controlling the operation and performance of one or more of the various other components of computing device 605 for implementing the functionality, steps, and/or performance of the present invention. In certain embodiments, processor 915 interprets and executes the processes, steps, functions, and/or operations of the present disclosure, which may be operatively implemented by the computer readable program instructions.

The storage device 920 may include removable/non-removable, volatile/non-volatile computer-readable media, such as, but not limited to, non-transitory machine-readable storage medium, such as magnetic and/or optical recording media and their corresponding drives. The drives and their associated computer-readable media provide for storage of computer-readable program instructions, data structures, program modules and other data for operation of computer system 900 in accordance with the different aspects of the present invention. In embodiments, storage device 920 may store operating system 945, application programs 950, and program data 955 in accordance with aspects of the present invention.

The system memory 925 may include one or more storage mediums, including for example, non-transitory machine-readable storage medium, such as flash memory, permanent memory, such as read-only memory ("ROM"), volatile memory, such as random-access memory ("RAM"), any other suitable type of non-transitory storage component, or any combination thereof. In some embodiments, an input/output system 960 (BIOS) including the basic routines that help to transfer information between the various other components of computer system 900, such as during start-up, may be stored in the ROM. Additionally, data and/or program modules 965, such as at least a portion of operating system 945, program modules, application programs 950, and/or program data 955, that are accessible to and/or presently being operated on by processor 915, may be contained in the RAM.

The one or more input devices 930 may include one or more mechanisms that permit an operator to input information to computer system 900, including, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 935 may include one or more mechanisms that output information to an operator, such as, but not limited to, audio speakers, headphones, audio line-outs, visual displays, antennas, infrared ports, tactile feedback, printers, or combinations thereof.

The communication interface 940 may include any transceiver-like mechanism (e.g., a network interface, a network adapter, a modem, or combinations thereof) that enables computer system 900 to communicate with remote devices or systems, such as a mobile device or other computing devices such as a server in a networked environment, e.g., cloud environment. For example, computer system 900 may be connected to remote devices or systems via one or more local area networks (LAN) and/or one or more wide area networks (WAN) using communication interface 940.

As discussed herein, the computer system 900 may perform tasks (e.g., process, steps, methods and/or functionality) in response to processor 915 executing program instructions contained in non-transitory machine-readable storage medium, such as a system memory 925. The program instructions may be read into system memory 925 from another computer-readable medium (e.g., non-transitory machine-readable storage medium), such as data storage device 920, or from another device via the communication interface 940 or server within or outside of a cloud environment. In embodiments, an operator may interact with computer system 900 via the one or more input devices 930 and/or the one or more output devices 935 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system comprising:
   a plurality of robots located on a premises, wherein the plurality of robots comprise a first robot configured to perform autonomous operations on a plurality of airplane models;
   an on-premises server located on the premises, communicatively coupled with the first robot, and associated with a first airplane model of the plurality of airplane models; and
   a top-tier server communicatively coupled with the on-premises server and associated with the first airplane model,
   wherein the first robot is configured to:
      determine that a first autonomous operation and a second autonomous operation are to be performed on at least a portion of an airplane, wherein the airplane is of the first airplane model;
      generate, using one or more sensors, first data for the first autonomous operation; and
      send a request and the first data to the on-premises server, the request indicating the first autonomous operation,
      receive, from the on-premises server, second data associated with the first autonomous operation;
      execute locally, using the second data, a second process to perform the second autonomous operation; and
      send, to the on-premises server, third data associated with performance of the second autonomous operation;
   wherein the on-premises server is configured to:
      receive the request, the first data, and the third data from the first robot;
      execute locally, using the first data, a first process associated with the first autonomous operation to generate the second data;
      send the second data to the first robot; and
      send, to the top-tier server, fourth data that corresponds to the third data and that is associated with the performance of the second autonomous operation, and
   wherein the top-tier server is configured to:
      store the fourth data in association with a tail number of the airplane.

2. The system of claim 1, wherein the system further comprises a second server located on the premises, communicatively coupled with the plurality of robots and the top-tier server and associated with a second airplane model of the plurality of airplane models, and wherein the request is sent to the on-premises server instead of the second server based on the second autonomous operation being associated with the first airplane model.

3. The system of claim 1, wherein the on-premises server is located in a first area on the premises, wherein the system further comprises a second server located in a second area on the premises, communicatively coupled with the plurality of robots and the top-tier server, and associated with a second airplane model of the plurality of airplane models, and wherein the request is sent to the on-premises server instead of the second server based on the first robot being located in the first area.

4. The system of claim 1, wherein the on-premises server is associated with a first type of autonomous operations, wherein the system further comprises a second server communicatively coupled with the plurality of robots and the top-tier server, and associated with a second airplane model of the plurality of airplane models and with a second type of autonomous operations, and wherein the request is sent to the on-premises server instead of the second server based on the first autonomous operation being of the first type of autonomous operations.

5. The system of claim 1, wherein the portion of the airplane includes an airplane part, wherein the top-tier server is further configured to send a set of autonomous operational instructions associated with the airplane part to the on-premises server, and wherein the on-premises server is further configured to send an autonomous operational instruction of the set to a device located at a jig for presentation by the device.

6. The system of claim 1, wherein the portion of the airplane includes an airplane part, and wherein the on-premises server is further configured to:
receive, from a device located at a jig, fifth data indicating loading of the airplane part to the jig; and
request the first robot to move to an area that contains the jig based on the fifth data.

7. The system of claim 6, wherein the on-premises server is further configured to:
send, to the top-tier server, sixth data indicating the loading of the airplane part;
receive, from the top-tier server, a set of autonomous operational instructions associated with the airplane part;
determine, based on the set of autonomous operational instructions, that the second autonomous operation is to be performed on the airplane part; and
determine a capability of the first robot to perform the second autonomous operation and a status of the first robot, wherein the first robot is requested to move to the area based on the capability and the status.

8. The system of claim 6, wherein the on-premises server is further configured to:
determine that the second autonomous operation is to be performed on the airplane part; and
determine that the first robot is to perform the second autonomous operation after the airplane part is loaded to the jig.

9. The system of claim 6, wherein the request of the first robot is received by the on-premises server after the first robot being requested by the on-premises server to move to the area and after the first robot having moved to the area.

10. The system of claim 9, wherein the first autonomous operation comprises registering the first robot to the airplane part such that a relative position between the first robot and the airplane part is determined in a coordinate system of the first robot, wherein the first data comprises a point cloud or image data, and wherein execution of the first process uses an artificial neural network (ANN) model having the first data as input and the second data as output.

11. The system of claim 1, wherein the on-premises server is further configured to store status data indicating a status of the first robot but not autonomous operational data indicating autonomous operations performed by the first robot on at least the portion of the airplane, and wherein the top-tier server is configured to store the autonomous operational data.

12. The system of claim 1, wherein the first robot is further configured to:
store a configuration type indicating that a first type of autonomous operations is associated with remote execution by the on-premises server and a second type of autonomous operations is associated with local execution by the first robot; and
determine that the first autonomous operation is of the first type and the second autonomous operation is of the second type, wherein the request is sent based on the first autonomous operation being of the first type.

13. The system of claim 1, further comprising a second server located on a different premises, communicatively coupled with a second robot of the plurality of robots and with the top-tier server and associated with the first airplane model or a second airplane model of the plurality of airplane models.

14. The system of claim 1, further comprising a second server associated with a second airplane model and communicatively coupled with the first robot but not with the on-premises server and the top-tier server, and another top-tier server associated with the second airplane model and communicatively coupled with the second sever but not the on-premises server and the top-tier server.

15. A server located on a premises and comprising:
one or more processors; and
one or more memory storing instructions that, upon execution by the one or more processors, configure the server to:
receive, from a first robot located on the premises, a request for a first autonomous operation to be performed on at least a portion of an airplane and first data for the first autonomous operation, the first data generated by one or more sensors of the first robot, the server associated with an airplane model, and the airplane being of the airplane model;
execute locally, using the first data, a first process associated with the first autonomous operation to generate second data;
send the second data to the first robot, the second data causing the first robot to execute locally a second process to perform a second autonomous operation on at least the portion of the airplane;
receive, from the first robot, third data indicating performance of the second autonomous operation; and
send, to a top-tier server associated with the airplane model, fourth data that corresponds to the third data and that is associated with the performance of the second autonomous operation.

16. The server of claim 15, wherein the execution of the instructions further configures the server to:
receive, from the top-tier server, autonomous operational instructions associated with performing the second autonomous operation but not with performing the first autonomous operation; and
request, based on the autonomous operational instructions, the first robot to move to an area that contains at least the portion of the airplane, wherein the request is received after the first robot moves to the area and based on a determination local to the first robot that the first autonomous operation is needed to perform the second autonomous operation.

17. The server of claim 15, wherein the execution of the instructions further configures the server to:
- receive, from a device, fifth data indicating an output of a manual process performed on at least the portion of the airplane; and
- send, to the top-tier server, sixth data that corresponds to the first data and that indicates the output.

18. The server of claim 15, wherein the execution of the instructions further configures the server to:
- determine a priority associated with executing the first process based on other processes that are associated with the airplane model and that are being executed by the server for other robots located on the premises, wherein the first process is executed based on the priority.

19. The server of claim 15, wherein the execution of the instructions further configures the server to:
- determine a priority associated with executing the first process based on timing information included in the request and associated with the first autonomous operation, wherein the first process is executed based on the priority.

20. The server of claim 15, wherein the execution of the instructions further configures the server to:
- determine a priority associated with executing the first process based on a type of the first autonomous operation and a priority table, wherein the first process is executed based on the priority.

21. The server of claim 15, wherein the execution of the instructions further configures the server to:
- determine a third autonomous operation to be performed on at least on the portion of the airplane or on a different portion of the airplane by the first robot or by another device located on the premises;
- determine a priority associated with executing the first process based on the third autonomous operation, wherein the first process is executed based on the priority.

22. The server of claim 15, wherein the execution of the instructions further configures the server to:
- receive, from a device located on the premises, another request for a third autonomous operation to be performed by the device, the device being the same as or different from the first robot;
- determine an inter-dependency between the first autonomous operation and the third autonomous operation;
- determine an execution status of a third process associated with the third autonomous operation; and
- determine a priority associated with executing the first process based on the execution status of the third process, wherein the first process is executed based on the priority.

23. A method implemented on a server that is located on a premises, the method comprising:
- receiving, from a first robot located on the premises, a request for a first autonomous operation to be performed on at least a portion of an airplane and first data for the first autonomous operation, the first data generated by one or more sensors of the first robot, the server associated with an airplane model, and the airplane being of the airplane model;
- executing locally, using the first data, a first process associated with the first autonomous operation to generate second data;
- sending the second data to the first robot, the second data causing the first robot to execute locally a second process to perform a second autonomous operation on at least the portion of the airplane;
- receiving, from the first robot, third data indicating performance of the second autonomous operation; and
- sending, to a top-tier server associated with the airplane model, fourth data that corresponds to the third data and that is associated with the performance of the second autonomous operation.

24. The method of claim 23, wherein the portion of the airplane includes an airplane part, and wherein the method further comprises:
- receiving, from a device located at a jig, an indication of a loading of the airplane part to the jig;
- determining that the request was received after the indication is received; and
- determining that the request is permitted based on the request being received after the indication is received.

25. The method of claim 24, further comprising:
- receiving, from the top-tier server, a set of autonomous operational instructions associated with the airplane part; and
- determining, based on the set of autonomous operational instructions, that the first autonomous operation is to be performed after the loading of the airplane part to the jig.

26. The method of claim 25, further comprising:
- sending, to the top-tier server, fifth data that indicates the loading of the airplane part to the jig, wherein the set of autonomous operational instructions is received based on the fifth data.

27. The method of claim 23, further comprising:
- determining that the request is permitted based on a timing of the request, a type of the first robot, and a dependency of the first autonomous operation to one or more other autonomous operations to be performed on at least the portion of the airplane, wherein the first process is executed based on the request being permitted.

28. The method of claim 23, further comprising:
- querying, based on the request, the top-tier server whether the first autonomous operation is to be performed or not; and
- receiving, from the top-tier server, an indication that the first autonomous operation is to be performed, wherein the first process is executed based on the indication.

* * * * *